H. LOHMILLER.
COMBINED ELEVATING DEVICE AND SHOCK ABSORBER.
APPLICATION FILED DEC. 16, 1915.

1,193,570.

Patented Aug. 8, 1916.

INVENTOR
Harry Lohmiller,
BY
Dyker Caufield
ATTORNEYS

UNITED STATES PATENT OFFICE.

HARRY LOHMILLER, OF RAHWAY, NEW JERSEY.

COMBINED ELEVATING DEVICE AND SHOCK-ABSORBER.

1,193,570.   Specification of Letters Patent.   Patented Aug. 8, 1916.

Application filed December 16, 1915. Serial No. 67,120.

*To all whom it may concern:*

Be it known that I, HARRY LOHMILLER, a citizen of the United States, and a resident of Rahway, county of Union, and State of New Jersey, have invented certain new and useful Improvements in Combined Elevating Devices and Shock-Absorbers, of which the following is a specification.

This invention relates to an improved device that combines an elevating device for vehicles and a shock absorber for vehicles, these being of the type that are operated by air in a cylinder.

The invention comprises a device of this kind which is adapted to be permanently secured to a vehicle, being attached to the chassis and having a part adapted to be forced therefrom by fluid under pressure, preferably air, and having a connection between an air-operated piston and the axle of the vehicle for taking up sudden or excessive shocks and thus acting to make the riding of the car easier.

The invention is further designed to provide a device of this kind which does not take up an excessive amount of room on the vehicle, can be conveniently placed on the chassis and axles of the car so as to provide one at each side of the front and one at each side of the rear, whereby not only is the riding of the car made easy, but the whole vehicle can be raised at the same time, if desired, by reason of suitable pipe connections to a pump, such, for instance, as is shown in Patent No. 1,161,706, of Nov. 23, 1915.

The invention is illustrated in the accompanying drawing in which—

Figure 1:
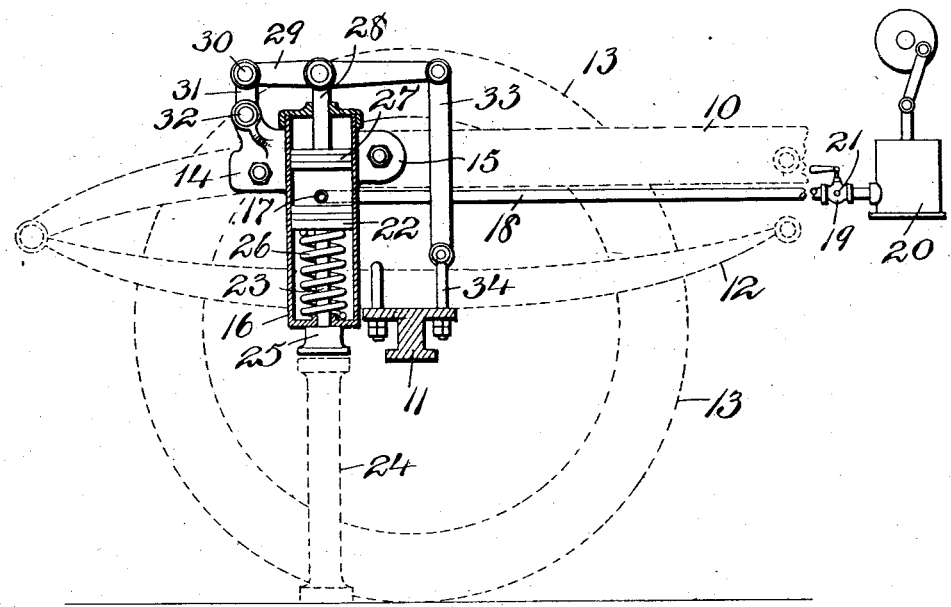
Figure 2:
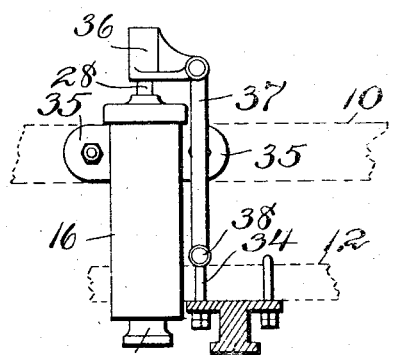

Figure 1 is a view of part of a vehicle showing one end of the chassis and one wheel, the device being shown in section, the view also showing, in a diagrammatic way, a pump and a valved connection between the pump and the cylinder or chamber of the device. Fig. 2 is a side view of a similar construction, but illustrating a modified form of connection between the device and the axle of the wheel.

In the drawing 10 shows one of the side frames of a chassis, 11 is one axle of the vehicle, 12 is a type of spring for supporting the chassis on the axle, and 13 is a wheel on the axle 11. Mounted on the chassis in any desired manner, in the form shown this being done by plates 14 and 15, is a cylinder 16 which is connected at a suitable point, as 17, to a pipe 18, which pipe is shown as connected through the valve 19 to a pump 20. The pump is shown only in a conventional way, but any suitable form of pump can be used and any form of valve employed, the pump, however, being usually so situated that it can be operated from the engine of the automobile so that the engine can assist in raising the car when necessary. The valve 19 preferably has a vent hole 21 in it, which vents the pipe 18 when the valve 19 is turned to shut off the pump from the cylinder. In the cylinder is a piston 22 which has a piston rod 23 projecting from its lower end, the piston rod 23 being adapted to rest on any suitable jack or post 24, and for the purpose of making a proper bearing for the piston rod 23 it is usually provided with a foot 25. The foot 25 also acts to limit the upward movement of the piston, which upward movement is due to a spring 26 which is situated between the lower end of the piston 16 and the lower face of the piston 22, the foot being so placed that the piston 22 does not cover the opening 17 of the pipe 18.

In the upper part of the cylinder above the opening 17 is a piston 27 with a piston rod 28 which projects through the upper end of the casing, which is the end opposite the end from which the piston rod 23 projects. The piston 27 is connected to the axle 11, the type illustrated comprising a lever 29 which is pivoted intermediate of its length to the end of the piston rod 28 which is pivoted at one end, as at 30, to a link 31 which is in turn pivoted to the bracket 32 of the plate 14, the other end of the lever 29 being connected to an arm 33 which in turn is fastened to one of the clips 34 which connects the spring 12 with the axle 11. It will be evident that other means of attaching the arm 33 to the axle, or the parts connected to the axle, can be employed.

When the device is to be used to elevate a vehicle the jack 24, which can be a short piece of timber or an ordinary jack or any other suitable supporting means, is placed underneath the foot 25, and when the valve 19 is opened air under pressure is permitted to pass into the cylinder 16, and the pressure of air forces the piston 22 downward, which forces the foot 25 against the support 24 and the cylinder, and consequently the vehicle, is raised, this being assisted usually by a raising of the piston 27 which assists by forcing upward on the lever 29 and consequently exerting an upward pressure on the body through the arm 33 on the axle 11. When the elevating device or jack is in the position where it will raise the vehicle and it is desirable to allow it to descend, the valve 19 can be turned to shut off the pipe 18 from the source of air under pressure and so that it vents the pipe 18 through the opening 21. This permits the weight of the car to force the air from the cylinder 16 and when the weight of the car has been removed from the jack, the spring 26 completes the movement of the piston 22 so as to hold the foot 25 in a position where it does not project unnecessarily and prevents rattling of these parts when the vehicle is in motion. When ordinarily running the vehicle and the elevating device is not in use, the piston 27, operating in a cylinder which is fastened to the chassis and connected to the axle, acts as a shock absorber and prevents the sudden jars and shocks incidental to riding over rough roads, and by reciprocating in the cylinder, acts to equalize the movement of the chassis and to prevent excessive rebounding of the spring 12.

A similar device is shown in Fig. 2, the cylinder 16 being secured to the chassis by plates 35, and the top of the piston rod 28 is provided with a bracket 36, the outer end of the bracket being pivotally connected to an arm 37 which is in turn connected, as at 38, to one of the clips 34 or to any other suitable point that moves with the axle. This is a more compact form of device than that shown in Fig. 1 and is particularly adapted for lighter cars where less strain is placed upon the device.

The device is cheap to make, is simply operated and provides a compact and easily accessible apparatus for performing two functions, that of absorbing the shock and that of elevating the vehicle.

It will be understood that all the cylinders 16 on a car can be connected up to the same pump and they can either be operated individually or all together. It will also be understood that means for venting the cylinder to release the elevating mechanism can be used that are different from the venting pump 21.

Having thus described my invention, I claim:

1. A combined elevating device and shock absorber comprising a cylinder with opposed pistons with piston rods projecting from the opposite ends of the cylinder, an air space between the pistons, means for supplying air under pressure to the space, a spring under one of the pistons, a connection between the other piston and the axle of a vehicle, and means for securing the cylinder to the chassis of the vehicle.

2. A combined elevating and shock absorbing device comprising a cylinder having means for securing it to a chassis, a piston in the cylinder, said piston being connected to the axle of the vehicle, a second piston in the cylinder, means for admitting air under pressure to act on the second piston, and a projecting part connected to the second piston.

3. A combined elevating device and shock absorber comprising a cylinder secured to the chassis of a vehicle, a pipe supplying air under pressure to the central part of the cylinder, a piston on each side of the central part, the piston rods of the pistons projecting from opposite ends of the cylinder, and a connection between one of the piston rods and the axle of the vehicle.

4. A combined elevating device and shock absorber comprising a chamber secured to the chassis, a pipe connection between the chamber and a source of air under pressure, an elevating device in the chamber, and a shock absorber in the chamber and connected with the axle of the vehicle.

5. A combined elevating device and shock absorber comprising a cylinder secured to the chassis of a vehicle, pistons in the cylinder and having separate rods projecting from the opposite ends of the cylinder, a spring operating one piston in one direction, a pipe connection to supply air under pressure to the cylinder so as to force the spring to yield, and a connection between the other piston rod and the axle of the vehicle.

6. A combined elevating device and shock absorber comprising a cylinder mounted on the chassis of a vehicle, an upper piston with a projecting piston rod, a connection between the rod and the axle of the vehicle, the piston being capable of movement in both directions, a lower piston with a projecting piston rod, a foot on the last-mentioned rod, a spring between the lower piston and the bottom of the cylinder, and means for supplying air under pressure to the cylinder between the pistons.

In testimony that I claim the foregoing, I hereunto set my hand, this 8th day of December, 1915.

HARRY LOHMILLER.